April 18, 1967  R. G. ROBINSON  3,314,466
TIRE TRACTION AID
Filed June 28, 1965
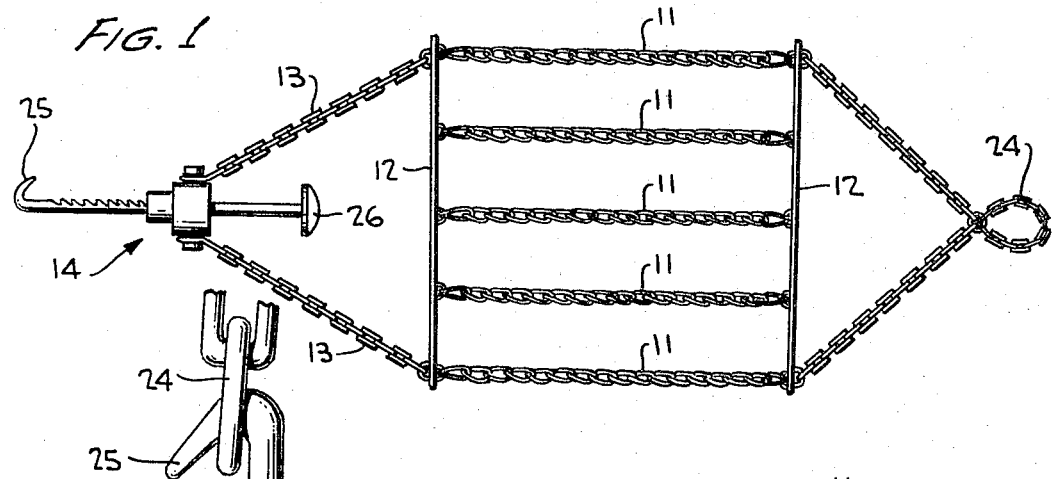
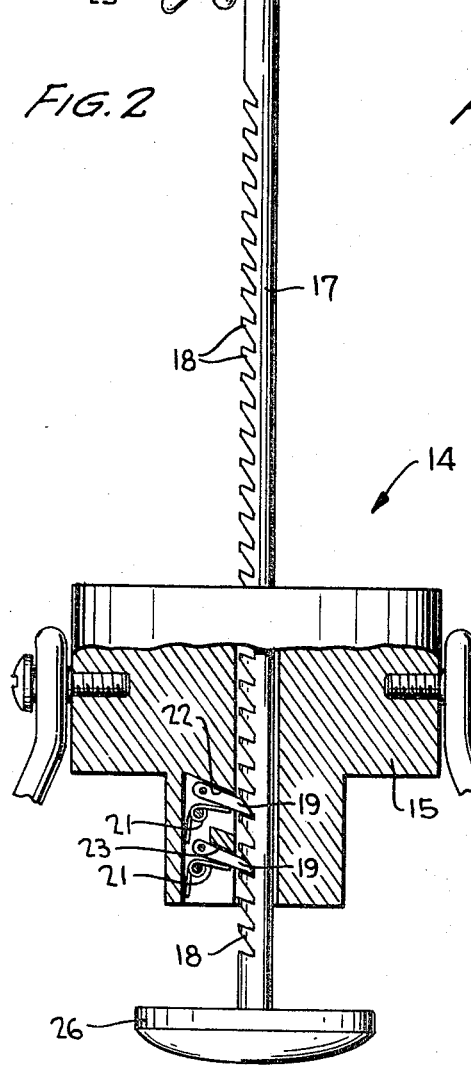
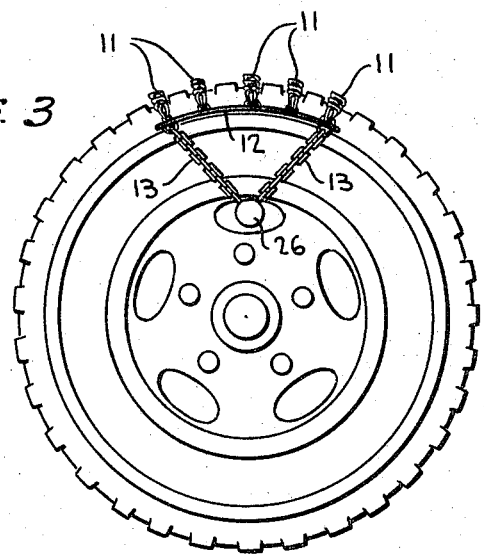
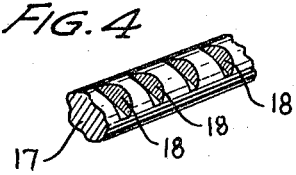
INVENTOR,
RICHARD G. ROBINSON
BY Harry M. Saragovitz
Edward J. Kelly
Herbert Berl
John W. Potest, Jr.
ATTORNEYS

United States Patent Office 3,314,466
Patented Apr. 18, 1967

3,314,466
TIRE TRACTION AID
Richard G. Robinson, 6616 Braddock Road,
Annandale, Va. 22003
Filed June 28, 1965, Ser. No. 467,794
1 Claim. (Cl. 152—237)

The invention described herein may be manufactured and used by or for the Government of the United States of America for governmental purposes without the payment to me of any royalties thereon.

This invention relates to snow and mud tire chains and more particularly to a chain clamp that is readily installed and easily removed.

When traction is needed as the result of the temporary loss of traction such as occurs in snow and mud, prior tire clamps were either ineffective or very difficult to install and very difficult to remove after the normal road traction was restored.

This invention provides a readily installable and instantaneously removable tire clamp which is efficient and easy to operate.

It is, therefore, a feature of this invention to provide an efficient tire traction aid.

It is another feature of this invention to provide a tire traction aid device which is easily installed.

It is still another feature of this invention to provide a tire traction aid device which is readily removed.

It is a further feature of this invention to provide a tire traction aid device of serviceable construction.

The exact nature of this invention as well as other objects and advantages thereof will be readily apparent from consideration of the following specification relating to the annexed drawing in which:

FIGURE 1 is a pictorial representation of the traction aid.

FIGURE 2 shows in cross section the clamping means of the traction aid.

FIGURE 3 is a pictorial representation of the traction aid installed on a tire.

FIGURE 4 is a detail of the ratchet rod of the fastening means.

Briefly, this invention is directed to a traction aid made up of a traction means, such as chain links, which are mounted on the tread of a tire. The mounting means includes connectors from the traction means to a ratchet type securing means. This ratchet type securing means is provided with a hook which is inserted through the wheel disc to capture the connector from the opposite end of the traction means. The ratchet means is then readily adjusted to a tightened position to enable the use of the traction aid. After use, the traction aid is removed simply by turning the ratchet means ¼ of a turn to release the keepers and to loosen the connector means and free the hook so as to readily remove the traction aid. Tests have shown that this can be accomplished in approximately ten seconds.

Turning now to the figures in which a typical embodiment is shown, the traction means 11 can be any preferred chain configuration as needed. The number of chain sections 11, usually three to six, is also a matter determined by need. Spacers 12 separate and locate the chain links 11 and enable them to be aligned properly across the tire tread. Connector links 13 connect the spacers 12 to the securing means 14.

As seen in FIGURE 2, the securing means 14 is made up of a body member 15 to which the connector links 13 are secured by securing means which can be screws 16, or any other proper securing means. Through the body member 15 goes a circular ratchet rod 17 having ratchet teeth 18 thereon. Mounted within body 15 are keepers 19 which are spring loaded to keep the ratchet teeth secured when the traction aid is installed on the tire. This means that the keepers 19 can move against springs 21 to free the ratchet teeth 18 when the ratchet rod 17 is being pulled in a direction which results in the tightening of the traction aid. Keepers 19 will be stopped from movement in the opposite direction by surfaces 22 and 23 of portions of the body member 15, or other securing means attached thereto. The release of the ratchet rod from the keepers is accomplished by rotating the rod to present a surface of the rod having no teeth to the keepers. This permits the ratchet rod 17 to be readily moved through the body 15 so that the opposite securing means 24 which can be a portion of chain, for example, from hook 25 at the end of ratchet rod 17. This operation is then controlled by knob 26 on the opposite end of ratchet rod 17 from hook 25. The teeth 18 and keepers 19 are so shaped that the rotation of ratchet rod 17 will permit the keepers 19 to move out of engagement with teeth 18 which will clear the circular portion of rod 17 without jamming.

FIGURE 3 shows that the traction aid is easily mounted on the tire with the knob 26 readily available for ease of removal of the traction aid.

FIGURE 4 shows that ratchet rod 17 is circular in cross section and that the teeth 18 are disposed to capture the keepers 19 when moved in one direction and to release keepers 19 when moved in the other direction.

It is seen that I have provided an easy-to-install clamp-on type traction aid that is equally easy to remove. In tests of this device, the traction aid has been installed in twenty seconds and removed in ten seconds. During use of this aid, trucks that were helplessly stuck were moving under their own power within three minutes by use of this device.

Obviously many modifications and variations of the present invention are possible in the light of the above teachings. It is therefore to be understood, that within the scope of the appended claim, the invention may be practiced otherwise than as specifically described.

What is claimed is:

In a traction aid means for a vehicular wheel and tire:
a plurality of traction means each having two ends,
a pair of spacing means, one end of each of said traction means connected to one of said spacing means and the other end of each of said traction means connected to the other of said spacing means, and
means for securing said traction means to a tire including a hook and eye coupling means, means for connecting said eye means to one of said spacing means and means for connecting said hook means to the other of said spacing means,
said means for connecting said hook means having a body, a rigid ratchet rod with said hook means integral with one end thereof, a handle on the other end thereof, ratchet teeth along a portion of the circumference of said ratchet rod, and aperture means in said body confining the movement of said ratchet rod to be one dimensional therethrough, and keeper means mounted in said aperture means to engage said ratchet teeth to oppose movement of said hook away from said body, said hook means engaging said eye means when said traction aid means is mounted on said vehicular wheel and tire, said ratchet rod readily disengageable from said keeper means when said handle is turned, and said rigid ratchet rod enabling said hook means to readily engage said eye means when said traction aid is mounted on said vehicular wheel and tire.

References Cited by the Examiner
UNITED STATES PATENTS

| | | | |
|---|---|---|---|
| 1,928,474 | 9/1933 | Bambenek | 152—237 X |
| 2,505,724 | 4/1950 | Robbins | 152—213 X |

ARTHUR L. LA POINT, *Primary Examiner.*

C. W. HAEFELE, *Assistant Examiner.*